United States Patent
Refaat et al.

(10) Patent No.: US 12,275,412 B1
(45) Date of Patent: Apr. 15, 2025

(54) SLICE-BASED DYNAMIC NEURAL NETWORKS

(71) Applicant: Waymo LLC, Mountain View, CA (US)

(72) Inventors: Khaled Refaat, Mountain View, CA (US); Stéphane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/440,781

(22) Filed: Feb. 13, 2024

Related U.S. Application Data

(63) Continuation of application No. 17/487,903, filed on Sep. 28, 2021, now Pat. No. 11,938,943.

(51) Int. Cl.
| | |
|---|---|
| *B60W 40/00* | (2006.01) |
| *G06F 18/211* | (2023.01) |
| *G06F 18/23* | (2023.01) |
| *G06N 3/08* | (2023.01) |

(52) U.S. Cl.
CPC ........... *B60W 40/00* (2013.01); *G06F 18/211* (2023.01); *G06F 18/23* (2023.01); *G06N 3/08* (2013.01)

(58) Field of Classification Search
CPC ...... B60W 40/00; G06F 18/211; G06F 18/23; G06N 3/08
See application file for complete search history.

(56) References Cited

U.S. PATENT DOCUMENTS

| | | | |
|---|---|---|---|
| 2022/0012596 A1 | 1/2022 | Nie et al. | |
| 2022/0101112 A1* | 3/2022 | Brown | G10L 15/18 |
| 2022/0180528 A1 | 6/2022 | Dundar et al. | |
| 2022/0284283 A1* | 9/2022 | Yin | G06N 3/04 |
| 2023/0004760 A1 | 1/2023 | Mustikovela et al. | |
| 2023/0006889 A1* | 1/2023 | Thyagaturu | H04L 41/5054 |

OTHER PUBLICATIONS

Chai et al., "Multipath: Multiple probabilistic anchor trajectory hypotheses for behavior prediction," CoRR, Oct. 2019, arxiv.org/abs/1910.05449, 14 pages.

Chen et al., "Dynamic Convolution: Attention over Convolution Kernels," CoRR, Mar. 2020, imarXiv:1912.03458v2, 11 pages.

(Continued)

*Primary Examiner* — Richard M Camby
(74) *Attorney, Agent, or Firm* — Fish & Richardson P.C.

(57) ABSTRACT

Methods, systems, and apparatus, including computer programs encoded on computer storage media, for processing inputs using slice-based dynamic neural networks. One of the methods includes receiving a new input for processing by a neural network that includes a first conditional neural network layer that has a set of shared parameters and a respective set of slice parameters for each of a plurality of slices. One or more slices to which the new input belongs are identified. The new input is processed to generate a network output, including: receiving a layer input to the first conditional neural network layer; and processing the layer input using the set of shared parameters, the respective one or more sets of slice parameters for the identified one or more slices, but not the respective sets of slice parameters for any other slices to which the new input does not belong.

20 Claims, 4 Drawing Sheets

(56) References Cited

OTHER PUBLICATIONS

Han et al., "Dynamic Neural Networks: A Survey," CoRR, Feb. 2021, arxiv.org/abs/2102.04906, 20 pages.
He et al., "Deep residual learning for image recognition," Proceedings of the IEEE Conference on Computer Vision and Pattern Recognition, 2016, pp. 770-778.
He et al., "Mask r-cnn," Proceedings of the IEEE International Conference on Computer Vision, 2017, pp. 2961-2969.
Krizhevsky et al., "Imagenet classification with deep convolutional neural networks," Advances in neural information processing systems, 2012, 25:1097-1105.
Liang et al., "Learning lane graph representations for motion forecasting," European Conference on Computer Vision, Nov. 2020, 18 pages.
Lin et al., "Feature pyramid networks for object detection," Proceedings of the IEEE Conference on Computer Vision and Pattern Recognition, 2017, 9 pages.
Simonyan et al., "Very deep convolutional networks for large-scale image recognition," CoRR, Sep. 2014, arXiv:1409.1556, 14 pages.
Yang et al., "CondConv: Conditionally Parameterized Convolutions for Efficient Inference," CoRR, Sep. 2020, arXiv:1904.04971v3, 12 pages.

\* cited by examiner

SLICE-BASED DYNAMIC NEURAL NETWORKS

CROSS-REFERENCE TO RELATED APPLICATION

This is a continuation of U.S. application Ser. No. 17/487,903, filed on Sep. 28, 2021, the disclosure of which is considered part of and is incorporated by reference in the disclosure of this application.

BACKGROUND

This specification relates to processing inputs using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes a network input using a neural network to generate a network output for the network input. In particular, the neural network is a dynamic neural network that adapts to different slices of the training data to achieve good performance over well-represented slices as well as under-represented slices in the training data.

Neural networks can be trained on training data. Training data can include many training inputs that can belong to a plurality of slices. A slice of the training inputs is a subset of the training inputs included in the training data. The training inputs in different slices can belong to different data categories. For example, sensor data captured by an autonomous vehicle can be used as training data to train a behavior prediction neural network. The training inputs in the training data can belong to one or more slices based on the time of the day, e.g., "day time" and "night time". As another example, the training inputs can belong to one or more slices based on the type of the agent characterized in the sensor data, e.g., regular vehicles, trucks, and golf carts.

The training inputs can belong to a plurality of slices. Each slice can be determined based on a respective property of the training input. For example, a first slice can be based on the object type of an object in the training image, e.g., vehicle, cyclist, pedestrian, and so on. A second slice can be based on a geographic area where the training image depicts, e.g., San Francisco, San Diego, Phoenix, New York, and so on.

In some cases, the slices can be non-overlapping, i.e., a training input can belong to only one slice. In some other cases, the slices can overlap, i.e., any given training input can belong to multiple slices. For example, a training image depicting a cyclist in San Francisco can belong to the cyclist slice and the San Francisco slice.

While neural networks can achieve high quality performance in terms of overall accuracy, they may underperform on one or more slices of the training data that are under-represented. When the neural network is trained on all the training inputs in the training data, well-represented slices can affect the learning of the neural network weights more than other under-represented slices, potentially leading to poor performance on the under-represented slices.

For example, a behavior prediction neural network can be trained to predict the future behavior of an agent, e.g., vehicles, trucks, golf carts, based on input data including perceptual outputs over time and raw sensor data. The training data belong to a plurality of slices, and each slice can represent a different agent type. For example, regular vehicles, trucks, and golf carts can represent 98%, 1.8%, and 0.2% of the training inputs in the training data. While the behavior prediction neural network can be trained to perform well on average, the neural network may not perform well on the under-represented slices in the training data, e.g., trucks and golf carts.

One conventional solution is to use separate neural networks, one for each slice of the training data. However, this solution has many drawbacks. It may be difficult to maintain a large number of separate neural networks when the training data includes a large number of slices, e.g., 10 slices. In addition, some of the under-represented slices may not have enough training inputs to train a neural network, such as a deep neural network, and may therefore lead to the neural network for a given under-represented slice overfitting to the limited training data and failing to perform well on new inputs from the slice after training.

Another conventional solution is to use a neural network that has a common subnetwork, and multiple heads or subnetworks for each slice of the training data. However, this solution also has many drawbacks. The neural network may not have the flexibility to slightly modify the common subnetwork based on training inputs belonging to a specific slice because the common subnetwork is shared among the multiple heads. When multiple heads are trained simultaneously, the gradient component computed from one slice can conflict with the gradient component computed from another slice, leading to training updates that are not in favor of some of the slices. In addition, the training updates can be dominated by one or more slices representing the majority of the training inputs in the training data, resulting in a common subnetwork that performs well for the heads of the well-represented slices, but not so well for the heads of the under-represented slices.

In general, one innovative aspect of the subject matter described in this specification can be embodied in methods that include the actions of receiving a new input for processing by a neural network that has been trained on training data including a plurality of training inputs, wherein each training input belongs to one or more slices of a plurality of slices, and wherein the neural network includes a first conditional neural network layer that has (i) a set of shared parameters and (ii) a respective set of slice parameters for each of the plurality of slices; identifying one or more slices of the plurality of slices to which the new input belongs; and processing the new input using the neural network to generate a network output for the new input, wherein the processing includes: receiving a layer input to the first conditional neural network layer; and processing the layer input using (i) the set of shared parameters of the first conditional neural network layer, (ii) the respective one or more sets of slice parameters for the identified one or more slices in the plurality of slices, but not (iii) the respective sets of slice parameters for any other slices in the plurality of slices to which the new input does not belong. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The actions further include receiving a batch of training inputs selected from the plurality of training inputs, wherein each training input corresponds to a target network output; computing a gradient of a loss function for the batch of the training inputs; and updating current values of parameters of the neural network based on the computed gradient, including: updating the set of shared parameters of the first conditional neural network layer, and the respective sets of slice parameters for one or more identified slices that a training input in the batch belongs to. The loss function includes a first regularization term that regularizes the set of shared parameters, and a respective second regularization term that regularizes the respective set of slice parameters for each of the plurality of slices, and the second regularization term provides stronger regularization than the first regularization term. The new input is generated from sensor data captured by a sensor of an autonomous vehicle. The network output is a prediction used by a planning system of the autonomous vehicle to plan a future trajectory of the autonomous vehicle. The first conditional neural network layer includes a neuron that performs operations that satisfy: $f(WX+b+Indicator_1(W_1X+c_1)+ \ldots +Indicator_n(W_nX+c_n))$, wherein $f$ is an activation function, X is the layer input, W and b are the set of shared parameters, the training inputs belong to n slices, $W_i$ and $c_i$ are the respective set of slice parameters for each slice i, and i=1, 2, ..., n, $Indicator_i$ is an indicator function that equals 1 when the new input belongs to slice i, and equals 0 otherwise. The first conditional neural network layer includes a neuron that performs operations that satisfy: $f(WX+b+Indicator_1 W_1X+ \ldots +Indicator_n W_nX)$, wherein $f$ is an activation function, X is the layer input, W and b are the set of shared parameters, the training inputs belong to n slices, $W_i$ is the respective set of slice parameters for each slice i, and i=1, 2, ..., n, $Indicator_i$ is an indicator function that equals 1 when the new input belongs to slice i, and equals 0 otherwise. The first conditional neural network layer includes a neuron that performs operations that satisfy: $f(WX+b+Indicator_1 *c_1+ \ldots +Indicator_n *c_n)$, wherein $f$ is an activation function, X is the layer input, W and b are the set of shared parameters, the training inputs belong to n slices, ca is the respective set of slice parameters for each slice i, and i=1, 2, ..., n, $Indicator_i$ is an indicator function that equals 1 when the new input belongs to slice i, and equals 0 otherwise. The plurality of slices includes a first slice that includes training inputs of a first type and a second slice that includes training inputs of a second type that occurs less frequently in the training data than the first type. Each slice of the plurality of slices corresponds to a different agent type, wherein the new input includes data characterizing a target agent of a first agent type, wherein identifying the one or more slices of the plurality of slices to which the new input belongs includes identifying the slice corresponding to the first agent type. Each slice of the plurality of slices corresponds to a different cluster to which embedding of each training input belongs, wherein identifying the one or more slices of the plurality of slices to which the new input belongs includes: generating an embedding of the new input; identifying a cluster to which the embedding of the new input belongs; and identifying the slice corresponding to the identified cluster. Each slice of the plurality of slices corresponds to a different context, wherein the new input corresponds to a first context, wherein identifying the one or more slices of the plurality of slices to which the new input belongs includes identifying the slice corresponding to the first context. Performing the operations includes multiplying the layer input X by a pre-computed weight, wherein the precomputed weight is a sum of the shared weight W and the weights for the one or more slices to which the new input belongs.

Particular embodiments of the subject matter described in this specification can be implemented so as to realize one or more of the following advantages.

The described techniques allow a single neural network to be trained on all training data that belongs to different slices, instead of training separate neural networks for different slices. The described neural network includes one or more conditional neural network layers. Each conditional neural network layer has (i) a set of shared parameters and (ii) a respective set of slice parameters for each of the plurality of slices. During training, the conditional neural network layer can adapt the sets of slice parameters in response to receiving a network input that belongs to a specific slice, while still capturing the common features among different slices using the shared parameters. The slice-specific features can be captured by each set of slice parameters, and in some implementations, each set of slice parameters can include dynamic biases, dynamic weights, or both. The neural network is differentiable and can be trained end-to-end. In some implementations, the described techniques allow the neural network to be trained using regularization to ensure that the network is not significantly modified in response to receiving a training input that belongs to a particular slice. For example, each slice can have a different regularization term or a different regularization strength. The described techniques can regularize more heavily on the slice parameters for one or more rare slices to prevent overfitting, and can use less regularization on the shared parameters to encourage sharing between the slices. Rather than controlling the overfitting or under-fitting on the whole training dataset, the system can use different regularizations for the different sets of slice parameters to control overfitting and/or under-fitting related to a specific slice.

Once trained, the neural network can automatically adapt the computations in the conditional neural network layer by using the shared parameters and the set of slice parameters that corresponds to a particular slice to which a new input to the neural network belongs. Therefore, the neural network can provide good performance for both the new inputs belonging to the well-represented slices and the new inputs belonging to the under-represented slices. In some implementations, the new input to the neural network can belong to more than one slice, e.g., an input image depicting a vehicle cutting-in while unparking can belong to the "cutting-in" slice and the "unparking" slice. The conditional neural network layer can use the shared parameters and the two or more sets of slice parameters that correspond to the two or more slices to which the new input to the neural network belongs.

In some implementations, the increase in performance by using the conditional neural network layer has minimal additional computational overhead. When dynamic biases are used in the slice parameters of the conditional neural network layer, the system only needs to add one or more additional biases for the identified one or more slices to which a network input belongs. When dynamic weights are used in the slice parameters of the conditional neural network layer, the system can pre-compute a weight vector for the one or more slices to which a network input can possibly belong, e.g., by computing a sum of the shared weights and the weights for one or more possible slices. During inference onboard the autonomous vehicle, instead of having the overhead of an additional matrix multiplication, the system can select the pre-computed weight vector and can perform a single matrix multiplication.

The system can update a set of slice parameters corresponding to a particular slice or add a new set of slice parameters for a new slice even after the neural network has been trained or deployed, without affecting the shared parameters and the slice parameters of the other slices. In this way, the system can improve the accuracy of the model after deployment because the system can update the slice parameters for a specific slice without affecting the shared parameters and the slice parameters of other slices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a dynamic neural network that adapts to different slices of training data to achieve good performance over well-represented slices as well as under-represented slices in the training data. A slice of the training inputs is a subset of the training inputs included in the training data. The training inputs in different slices belong to different data categories.

Figure 1:
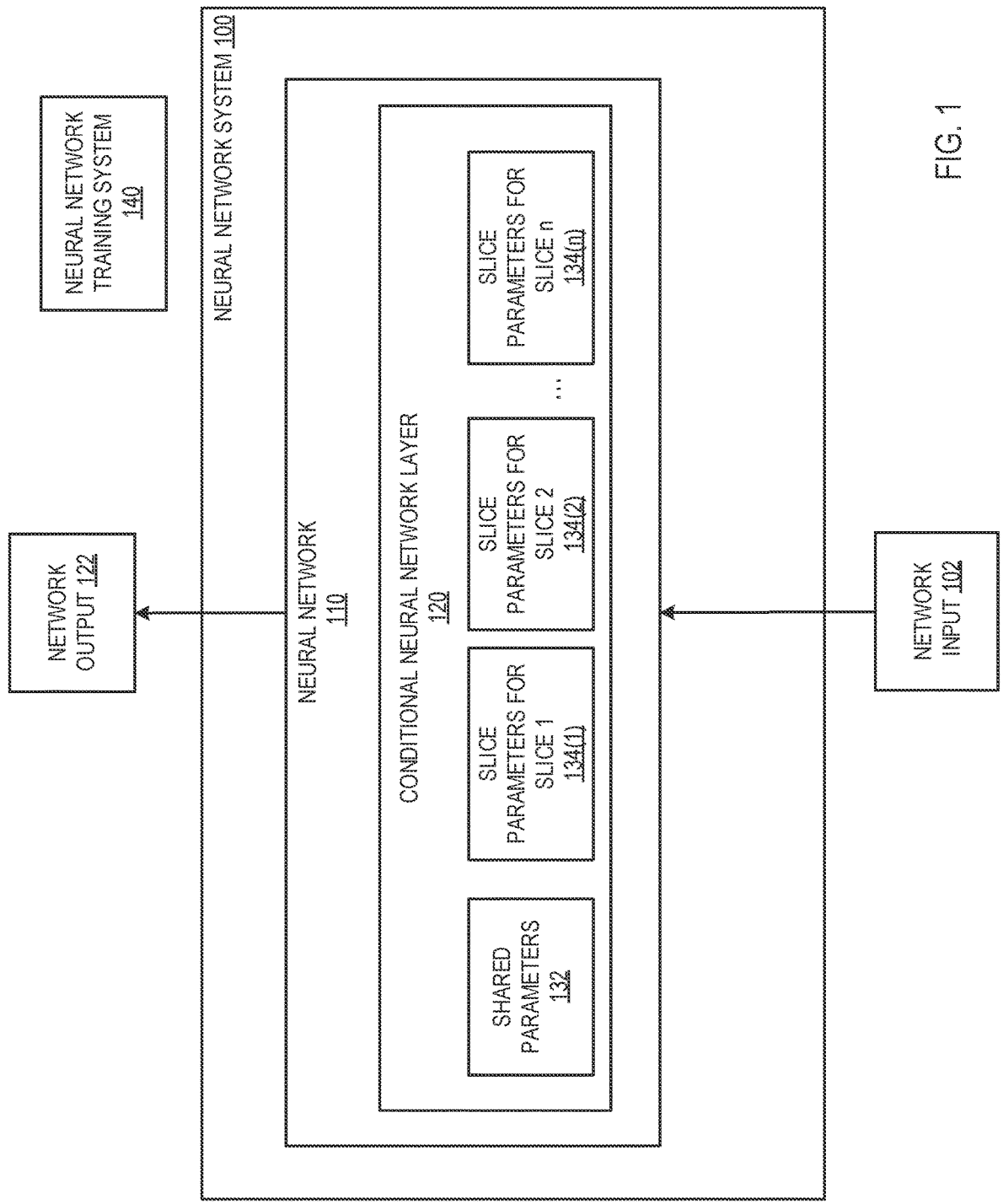
FIG. 1 shows an example neural network system.

FIG. 1 shows an example neural network system 100. The neural network system 100 is an example of a system implemented as computer programs on one or more computers in one or more locations in which the systems, components, and techniques described below are implemented.

The system 100 receives a network input 102 and processes the network input 102 to generate a network output 122 for the network input 102. In particular, the system 100 generates the network output 122 by processing the network input 102 through a neural network 110.

Neural networks can be trained on training data that includes a plurality of training inputs. The training inputs belong to a plurality of slices. For example, each slice of the plurality of slices can include training inputs of a different type. The training data generally includes an uneven number of inputs in each slice, with some slices having a much larger number of inputs than other slices. For example, the training inputs can include well-represented training inputs that occur frequently in the training data and under-represented training inputs that occur less frequently in the training data. When trained using conventional techniques, conventional neural networks can perform poorly on new inputs from the under-represented slices after training.

In some cases, the slices can be non-overlapping, i.e., a training input can belong to only one slice. In some other cases, the slices can overlap, i.e., any given training input can belong to multiple slices. For example, a training image depicting a cyclist in San Francisco can belong to the cyclist slice and the San Francisco slice.

The neural network 110 can be configured to perform any of a variety of kinds of machine learning tasks based on any of a variety of inputs, including image classification, object detection and/or segmentation, behavior prediction, scene understanding, and so on. The slices can be based on the types of training inputs to the neural network 110. For example, the neural network can be configured to perform object detection based on an image of an object in a scene.

In some implementations, the neural network can be configured to predict behaviors or trajectories of agents in the vicinity of an autonomous vehicle in an environment, e.g., generating probabilities that the agent will perform a certain behavior or follow a particular trajectory. The network inputs can belong to one or more slices of a plurality of slices.

For example, the neural network can be configured to predict a cut-in behavior of a vehicle in the vicinity of the autonomous vehicle. The plurality of slices can be based on the speed of the vehicle potentially cutting in, e.g., low speed, medium speed, and high speed. Alternatively, the system can determine a specific slice based on an unparking status, e.g., the vehicle moving from a parked position. The system can add dynamic parameters, e.g., weights and biases, corresponding to a particular behavior, e.g., speed of the vehicle or unparking.

As another example, the neural network can be configured to generate a driving plan for an autonomous vehicle. The plurality of slices can be based on the types of the road, e.g., freeways and surface streets (ordinary city streets as opposed to a freeway).

As another example, the plurality of slices can be based on different geographic locations. If the neural network model can process network inputs captured at different cities, the network inputs can belong to slices that are based on the cities, e.g., Phoenix, San Francisco, and Miami. The neural network can be trained to capture the common features of driving behaviors using the shared parameters, while using the slice parameters to make specific adjustments to the driving behaviors in each city.

Examples of image classification networks include VGG neural network (Simonyan, Karen, and Andrew Zisserman. "Very deep convolutional networks for large-scale image recognition." *arXiv preprint arXiv*:1409.1556 (2014)), the AlexNet neural network (Krizhevsky, Alex, Ilya Sutskever, and Geoffrey E. Hinton. "Imagenet classification with deep convolutional neural networks." *Advances in neural information processing systems* 25 (2012): 1097-1105.), ResNet neural network (He, Kaiming, et al. "Deep residual learning for image recognition." *Proceedings of the IEEE conference on computer vision and pattern recognition.* 2016), and so on.

Examples of object detection and/or segmentation networks include feature pyramid network (Lin, Tsung-Yi, et al. "Feature pyramid networks for object detection." *Proceedings of the IEEE conference on computer vision and pattern recognition.* 2017), mask r-cnn (He, Kaiming, et al. "Mask r-cnn." *Proceedings of the IEEE international conference on computer vision.* 2017.), and so on.

Examples of behavior prediction neural networks include MultiPath Network (Chai, Yuning, et al. "Multipath: Multiple probabilistic anchor trajectory hypotheses for behavior prediction." Proceedings of the Conference on Robot Learning, PMLR 100:86-99, 2020), LaneGCN (Liang, Ming, et al. "Learning lane graph representations for motion forecasting." European Conference on Computer Vision. Springer, Cham, 2020), and so on.

In some implementations, the training inputs can belong to one or more slices of a plurality of slices based on the size of the object characterized by each training input. For example, a given training input can belong to a first slice of small objects or a second slice of large objects. In some implementations, the training inputs can belong to one or more slices of a plurality of slices based on the context of the object characterized by each training input. For example, a given training input can belong to a slice based on weather conditions of the scene characterized in the training image, e.g., sun, rain, snow, tornado, etc.

In some implementations, the plurality of slices can include a first slice that includes training inputs of a first type and a second slice that includes training inputs of a second type that occurs less frequently in the training data than the first type. For example, road images of regular cars can occur more frequently than road images of golf carts.

The neural network 110 includes multiple neural network layers. One or more of the neural network layers in the neural network 110 can be conditional neural network layers 120 (referred to below as a "first conditional neural network layer"). The conditional neural network layer 120 can be, for example, a fully connected layer, a convolutional layer, a deconvolutional layer, a recurrent layer, and so on. Like a conventional neural network layer, the conditional neural network layer 120 receives a layer input and generates a layer output from the layer input. Like a conventional neural network layer, the conditional neural network layer 120 includes a set of shared parameters 132, e.g., weights and biases.

However, unlike a conventional neural network layer, the conditional neural network layer 120 further includes a respective set of slice parameters 134 for each of the plurality of slices of training inputs included in training data. For example, when there are n slices of the training inputs, the conditional neural network layer 120 includes a set of slice parameters 134(1) for slice 1, a set of slice parameters 134(2) for slice 2, . . . , and a set of slice parameters 134(n) for slice n.

The neural network system 100 can flexibly adapt to different network inputs 102 that belong to different data slices.

In particular, when a new network input 102 is received for processing by the neural network 110, the neural network system 100 can identify the particular slice of the plurality of slices to which the network input 102 belongs. In some implementations, the neural network system 100 can identify one or more slices to which the network input 102 belongs.

In some implementations, the neural network system 100 can receive additional data indicating the data type of the network input 102, and based on the additional data, the system can determine the particular slice to which the network input 102 belongs.

In some other implementations, the neural network 110 itself can be configured to generate, from the network input 102, a slice prediction indicating one or more particular slices to which the network input 102 belongs.

The conditional neural network layer 120 can process the layer input using (i) the set of shared parameters and (ii) the set of slice parameters for the identified one or more particular slices. The conditional neural network layer 120 does not process the layer input using the respective sets of slice parameters for any other slices in the plurality of slices to which the network input 102 does not belong.

For example, the neural network system 100 can identify that the network input 102 belongs to slice 1. The conditional neural network layer 120 can process the layer input using the set of shared parameters 132 and the set of slice parameters 134(1), but not any other sets of slice parameters, e.g., slice parameters 134(2), . . . , 134(n).

While a single conditional neural network layer 120 is shown in FIG. 1, in practice, the neural network 110 can have any number of conditional neural network layers 120. For example, some or all of the conventional neural network layers in an existing neural network architecture can be replaced with conditional neural network layers 120 to generate a desired dynamic architecture for the neural network 110.

In some implementations, the last few layers of the neural network 110 can be replaced with conditional neural network layers 120. For example, the last few fully connected layers can be replaced with conditional neural network layers 120. The VGG neural network and the AlexNet neural network are examples of neural networks for image classification, with the last few layers being fully connected layers. The last few fully connected layers can be replaced with conditional neural network layers.

In some implementations, one or more convolutional layers of the neural network 110 can be replaced with conditional neural network layers 120. For example, some or all of the convolutional layers of ResNet can be replaced with conditional neural network layers.

Thus, the neural network 110 includes one or more conditional neural network layers 120 and, in some cases, one or more other types of neural network layers, e.g., conventional convolutional layers, deconvolutional layers, fully connected layers, pooling layers, softmax layers, and so on. In general, the neural network 110 can have any architecture that includes at least one conditional neural network layer 120.

Prior to using the neural network 110 to process new inputs, a neural network training system 140 trains the neural network 110 on the training data to determine trained values of the parameters of the neural network 110, i.e., of the parameters of the other layers in the neural network and of the shared parameters 132 and the slice parameters 134 of the layer 120. The neural network training system 140 can be implemented on the same one or more computers as the neural network system 100 or on a different set of one or more computers that are in the same location or in a different location.

During training, the training system 140 processes the training inputs using the neural network 110 through an iterative training process. The training system 140 iteratively trains the neural network 110 by operating on batches of one or more training inputs in the training data. Each training input can include a network input 102 and a corresponding label, e.g., a target network output. For example, the training system 140 can receive batches of one or more training inputs to iteratively train a behavior prediction machine learning model. Each training input can include sensor data captured by one or more sensors of an autonomous vehicle. The sensor data can characterize an agent, e.g., a vehicle, in the vicinity of the autonomous vehicle in an environment. The label can be a ground truth label for the future trajectory of the agent.

The training system 140 iteratively processes the batches of the training inputs using the neural network 110. At each iteration, the training system 140 can generate, for each training input in the batch, a network output 122. In particular, during the processing of the training input, the training system 140 can provide a layer input to a conditional neural network layer 120 to generate a layer output. For example, the conditional neural network layer 120 can be a conditional convolutional layer or a conditional fully connected layer. The layer input can be an output generated from a previous neural network layer in the neural network 110.

The training system 140 can identify a slice to which the training input belongs. The training system 140 can process the layer input using the conditional neural network layer 120 with the set of shared parameters 132 and the set of slice parameters 134 for the identified slice, but not the respective sets of parameters 134 for any other slices to which the training input does not belong. Therefore, the neural network 110 can automatically adapt its parameters to different slices of the training inputs.

The system 100 or the training system 140 may also perform other operations on the output of the computations using the shared parameters and the slice parameters. For example, when the shared parameters and the slice parameters are used to perform a convolutional computation, the system can apply batch normalization, an activation function, or both to the convolution output, in order to generate the layer output of the conditional neural network layer 120.

If the conditional neural network layer 120 is the last layer of the neural network, the layer output can be the neural network output 122. Alternatively, the layer output from the conditional neural network layer 120 can be further processed by one or more additional layers of the neural network 110 to generate the network output 122.

The training system 140 can compare, for each training input in the batch of training inputs, the network output 122 of the training input to the target network output of the training input. The training system 140 can compute a gradient of a loss function for the batch of the training inputs based on the comparison. The training system 140 can update the current values of the parameters of the neural network 110 using the computed gradient.

In particular, the training system 140 can generate updated model parameter values for the shared parameters 132 based on the gradient of the loss function. The training system 140 can also generate, based on the gradient of the loss function, updated model parameter values of the set of slice parameters for the identified slice to which a training input in the batch belongs. For any given slice parameters, the contribution to the gradient is zero from all training inputs that do not belong to the given slice. Thus, the set of slice parameters for the given slice are updated using only the training inputs in the given slice. For example, when a training input in the batch belongs to slice 1, the training engine can generate updated model parameter values for the set of slice parameters 134(1) for slice 1 and the updated model parameter values for the shared parameters. Therefore, the respective set of slice parameters can be trained to learn the features of the training inputs that belong to each slice.

The training system 140 can generate the updated model parameters values by using an appropriate updating technique, e.g., stochastic gradient descent with backpropagation. The training system 140 can then update the collection of model parameters using the updated model parameter values. In this way, the sets of slice parameters for the plurality of slices can be automatically trained on the training data. Because the slice parameters for each slice are only updated using training inputs in the slice while the shared parameters are updated using training inputs from all slices, the trained neural network 110 with the trained values of the neural network parameters can have improved performance over all the slices. When receiving a new network input 102, the trained neural network 110 can perform well if the new network input belongs to a well-represented slice and can perform well if the new network input belongs to an under-represented slice.

Figure 2:
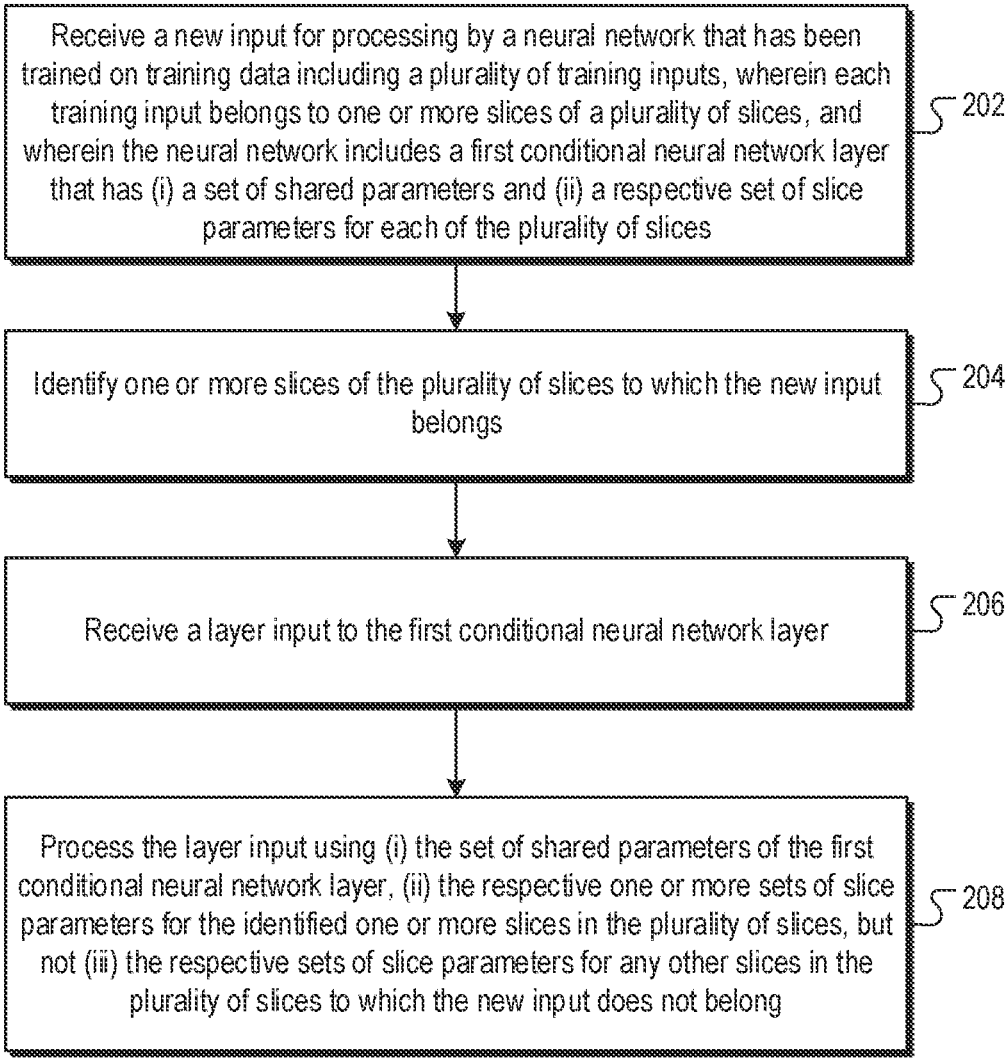
FIG. 2 is a flow diagram of an example process for processing a new input to generate a network output using a slice-based dynamic neural network.

FIG. 2 is a flow diagram of an example process 200 for processing a new input to generate a network output using a slice-based dynamic neural network. For convenience, the process 200 will be described as being performed by a system of one or more computers located in one or more locations. For example, a neural network system, e.g., the neural network system 100 of FIG. 1, appropriately programmed, can perform the process 200.

The system receives a new input for processing by a neural network that has been trained on training data including a plurality of training inputs (202). The training inputs belong to a plurality of slices. The neural network includes a first conditional neural network layer that has (i) a set of shared parameters and (ii) a respective set of slice parameters for each of the plurality of slices. For example, the first conditional neural network layer can be the layer 120 in FIG. 1, and can include a set of shared parameters 132 for all slices, and a respective set of slice parameters, e.g., 134(1), 134(2), . . . , 134(n), for each of the n slices.

The training data can include different types of training inputs that may occur at different frequencies in the training data. In some implementations, the plurality of slices can include a first slice that includes training inputs of a first type and a second slice that includes training inputs of a second type that occur less frequently in the training data than the first type. In other words, the first slice includes many more training inputs than the second slice.

For example, the training inputs can include inputs, e.g., generated from images or other sensor data, characterizing vehicles navigating on roadways and can include inputs of regular vehicles, and inputs of golf carts. The first slice can include training inputs of regular vehicles and the second slice can include training inputs of golf carts. Because golf carts rarely travel on the road, the training inputs of golf carts can occur less frequently in the training data than the training inputs of regular vehicles.

The system identifies one or more slices of the plurality of slices to which the new input belongs (204). For example, the system can determine that a new input belongs to the first slice of regular vehicles because the new input is an image of a sedan. As another example, the system can determine that a new input belongs to the second slice of golf carts because the new input is an image of a golf cart.

In some implementations, the system can determine that a new input belongs to two or more slices. For example, the new input can depict a car that is cutting-in while unparking from a parked location. The system can determine that the new input belongs to the "cutting-in" slice and the "unparking" slice.

In some implementations, each slice of the plurality of slices can correspond to a different cluster to which embedding of each training input belongs. The system can generate an embedding of the new input, and can identify a cluster to which the embedding of the new input belongs. The system can identify the slice to which the new input belongs by identifying the slice corresponding to the identified cluster.

For example, embeddings of the training inputs can belong to two clusters. The system can generate an embedding of a new input using an embedding neural network. The system can determine a particular cluster to which the embedding of the new input belongs. The system can identify the slice corresponding to the identified particular cluster.

In some implementations, the system can generate a distribution for the plurality of slices. The contribution from the different sets of slice parameters can be weighted accordingly using the distribution. In some implementations, the system can have a more compact basis or less number of parameters to define the weights across the slices, especially when there are lots of slices. For example, when there are 100 slices, the system can represent the weight vector offset for any slice as a weighted combination of a smaller set of weight vectors, e.g., 10 instead of 100. The system can jointly learn the weights that multiply each of the 10 basis weight vectors for slices. In some implementations, the basis weight vectors do not necessarily need to be a probability distribution. That is, the system can learn a low rank approximation to the matrix defined by the weight vectors for each slice.

In some implementations, the system can receive additional data indicating the data type of the new input, and based on the additional data, the system can determine the slice to which the new input belongs. For example, the system can receive an object type label indicating the type of the vehicle identified in the image. The object type label can be generated by another system, e.g., a perception system that uses another neural network model.

In some implementations, the neural network can be configured to generate, from the new input, a slice prediction indicating the particular slice to which the new input belongs. For example, the neural network can include a slice prediction subnetwork to generate the slice prediction. The first conditional neural network layer can take the slice prediction as input to switch on or off the respective set of slice parameters based on the slice prediction.

The system processes the new input using the neural network to generate a network output for the new input. In particular, during the processing, the system receives a layer input to the first conditional neural network layer (206). The layer input can be an output generated by a previous layer before the first conditional neural network layer in the neural network or, if the condition neural network layer is the first layer in the neural network, can be the training input.

Generally, the layer input is a single vector or a multi-dimensional array. For example, the layer input can be an M by N by K feature map generated from an input image. As another example, the layer input can be an M by N matrix of feature vectors generated from an input sequence. As another example, the layer input can be a single vector of length N that can be used as an input to a fully connected layer.

The system processes the layer input using (i) the set of shared parameters of the first conditional neural network layer, (ii) the respective one or more sets of slice parameters for the identified one or more slices in the plurality of slices, but not (iii) the respective sets of slice parameters for any other slices in the plurality of slices to which the new input does not belong (208). Therefore, the system can flexibly adapt its parameters based on the slice to which the new input belongs.

The system can generate a layer output from the first conditional neural network layer, and then provide the layer output as an input to the next layer in the neural network or as the final output of the neural network.

Generally, a neural network layer can include one or more neurons. A neuron in a neural network can be a computational unit that takes an input X and applies the following transformation: $f(WX+b)$. Here, $f$ is an activation function, e.g., a sigmoid activation function, a rectified linear unit activation function (ReLU), and so on. The W represents the weights that can be learned from training data using algorithms such as backpropagation. The b represents the bias. For example, the transformation $f(WX+b)$ can represent a conventional convolutional layer by setting most of the entries in W to be zero, except for the entries that are within the receptive field of the convolutional operation. As another example, the transformation $f(WX+b)$ can represent a conventional fully connected layer with full connections from all items in the input X.

In some implementations, the first conditional neural network layer can include a set of shared parameters and a respective set of dynamic biases. The dynamic biases can include a respective set of biases for each of the plurality of slices. For example, the first conditional neural network layer can include a neuron that performs operations that satisfy:

$$f(WX+b+\text{Indicator}_1 * c_1 + \ldots + \text{Indicator}_n * c_n), \quad (1)$$

wherein $f$ is an activation function, X is the layer input, W and b are the set of shared parameters. The training inputs can belong to n slices. The $c_i$ is the respective set of slice parameters, e.g., biases, for each slice i, and i=1, 2, ..., n. The $\text{Indicator}_i$ is an indicator function that equals 1 when the new input belongs to slice i, and equals 0 otherwise.

In some implementations, the first conditional neural network layer can include a set of shared parameters and dynamic weights. The dynamic weights can include a respective set of weights for each of the plurality of slices. For example, the first conditional neural network layer can include a neuron that performs operations that satisfy:

$$f(WX+b+\text{Indicator}_1 W_1 X + \ldots + \text{Indicator}_n W_n X), \quad (2)$$

wherein $W_i$ is the respective set of slice parameters, e.g., weights, for each slice i, and i=1, 2, ..., n.

In some implementations, the first conditional neural network layer can include a set of shared parameters, dynamic weights and dynamic biases. The dynamic weights and biases can include a respective set of weights and biases for each of the plurality of slices. For example, the first conditional neural network layer can include a neuron that performs operations that satisfy:

$$f(WX+b+\text{Indicator}_1(W_1 X + c_1) + \ldots + \text{Indicator}_n(W_n X + c_n)), \quad (3)$$

wherein $W_i$ and $c_i$ are the respective set of slice parameters, e.g., weights and biases, for each slice i, and i=1, 2, ..., n.

The slice parameters, e.g., the dynamic biases and/or dynamic weights, of a particular slice contributes to the loss function computation only when the network input belongs to the particular slice, e.g., $Indicator_i=1$. Otherwise, they do not contribute to the network output computation or the loss function computation during training, e.g., $Indicator_i=0$.

In some implementations, the increase in performance by using the conditional neural network layer has minimal additional computation overhead. For any given neural network layer, the system only needs to add one or more additional biases for the identified one or more slices to which a network input belongs, when dynamic biases are used in the slice parameters. For example, for a given network input that belongs to slice i, the system only needs to include an additional bias term $c_i$ in the layer output of the conditional neural network layer.

In some implementations, when dynamic weights are used in the slice parameters of the conditional neural network layer, the system can pre-compute a weight vector for the one or more slices to which a network input can possibly belong, e.g., by computing a sum of the shared weights and the weights for one or more possible slices. During inference onboard the autonomous vehicle, instead of having the overhead of an additional matrix multiplication, the system can select the pre-computed weight vector and can perform a single matrix multiplication.

For example, the training inputs can belong to three non-overlapping slices. The system can pre-compute three weight vectors for the three slices to which a network input can possibly belong, e.g., by computing $W+W_1$, $W+W_2$, and $W+W_3$. At inference time, when receiving a network input that belongs to slice 2, instead of having the overhead of an additional matrix multiplication $W_2X$, the system can select the pre-computed $W+W_2$ and can perform a single matrix multiplication $(W+W_2)X$.

Figure 3:
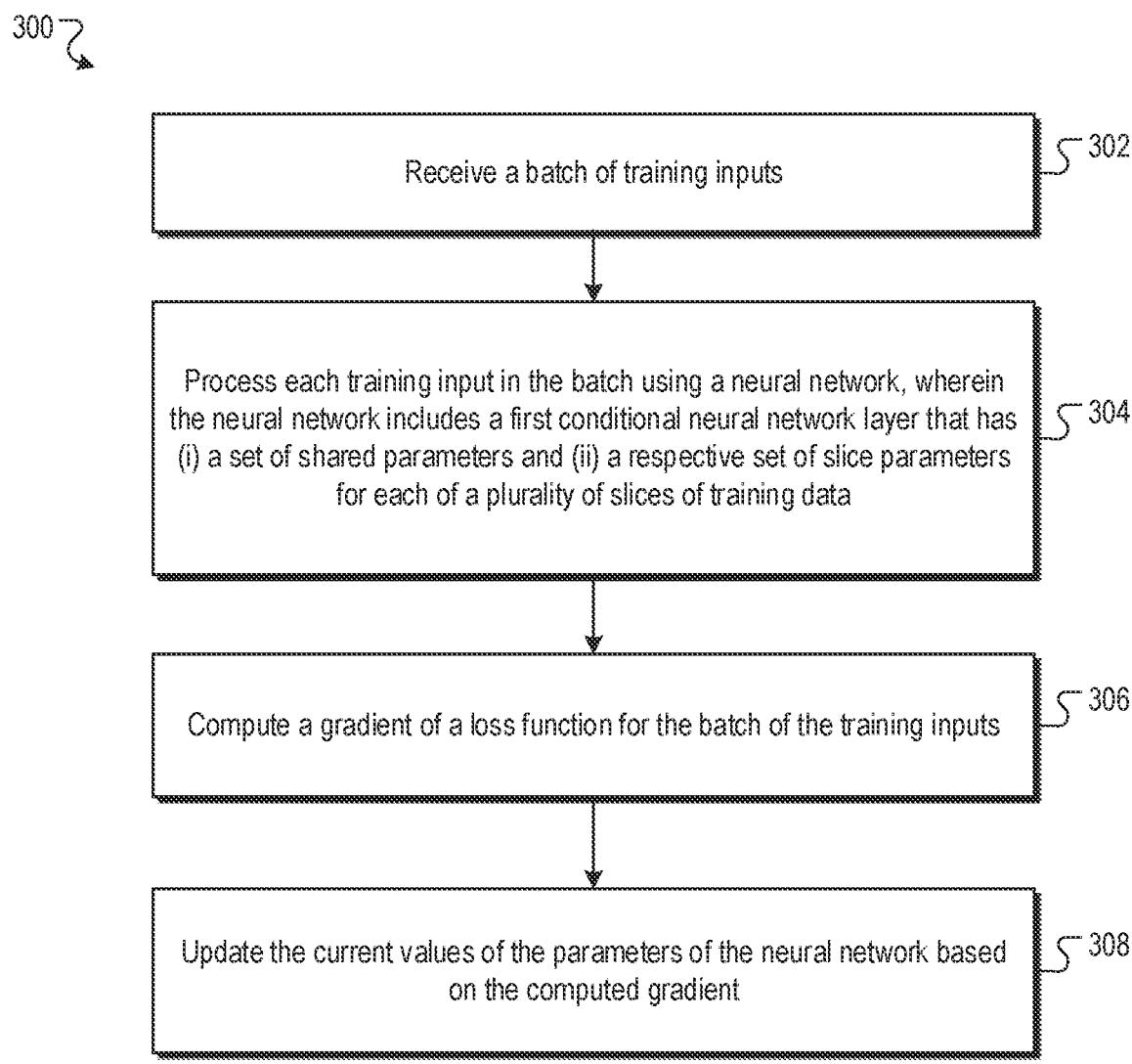
FIG. 3 is a flow diagram of an example process for training a dynamic neural network.

FIG. 3 is a flow diagram of an example process 300 for training a dynamic neural network. For convenience, the process 300 will be described as being performed by a system of one or more computers located in one or more locations. For example, a neural network system, e.g., the neural network training system 140 of FIG. 1, appropriately programmed, can perform the process 300.

The training data includes a plurality of training inputs and the training inputs belong to a plurality of slices. The system trains the dynamic neural network iteratively at a plurality of iterations. At each iteration, the dynamic neural network can be trained with a batch of training inputs from the plurality of training inputs in the training data.

The system receives a batch of training inputs (302). The batch of training inputs can include training inputs that belong to the same or different slices. Each training input corresponds to a target network output for the training input.

The system processes each training input in the batch using a neural network, wherein the neural network includes a first conditional neural network layer that has (i) a set of shared parameters and (ii) a respective set of slice parameters for each of a plurality of slices of training data (304). In particular, the system processed each training input in the batch as described above with reference to FIG. 2.

The system computes a gradient of a loss function for the batch of the training inputs (306). The system can compute a value of the loss function based on the network output and the target network output for each training input in the batch. Then the system can compute a gradient of the loss function for the batch of the training inputs.

The system updates the current values of the parameters of the neural network based on the computed gradient (308). The system can update, based on the gradient of the loss function, the set of shared parameters of the first conditional neural network layer, and the respective set of slice parameters for the identified slice in the plurality of slices that corresponds to one or more training inputs in the batch.

Because of the indicator function $Indicator_i$ that equals 1 when the new input belongs to slice i, and equals 0 otherwise, for any given slice, the contribution to the gradient is zero from all training inputs that do not belong to the given slice. Thus, the set of slice parameters for the given slice are updated using only the training inputs in the given slice.

For example, the system can receive a target behavior prediction output for a training input that includes a golf cart, and the training input can be one of the training inputs in a batch. The system can generate a behavior prediction output using the neural network, including using the adaptive parameters of the first conditional neural network layer included in the neural network. The system can compute a loss value for the batch, and the loss value for the batch includes a loss computed using the behavior prediction output of the golf cart and the target behavior prediction output. The system can update, based on the loss value for the batch, the set of shared parameters of the first conditional neural network layer, and the set of slice parameters for the golf cart slice, but not the set of slice parameters for the regular vehicle slice because none of the training inputs in the batch belong to the regular vehicle slice.

The respective set of slice parameters is only affected by training inputs belonging to the corresponding slice. Therefore, the neural network can be trained to learn specific adaptations for a particular slice by learning parameter values for the corresponding set of slice parameters. For example, the neural network can be trained to learn specific features for slice i by learning the bias $c_i$ and the weight $W_i$.

Generally, a neural network system can use regularization techniques during the training of a neural network model to avoid overfitting. Examples of regularization techniques can include L1 regularization, L2 regularization, and so on.

In some implementations, each slice can have a different regularization term or a different regularization strength. The system can regularize more heavily on the slice parameters for one or more rare slices to prevent overfitting. The system can use less regularization on the shared parameters to encourage sharing between the slices.

For example, the loss function can include a first regularization term that regularizes the set of shared parameters, and a respective second regularization term that regularizes the respective set of slice parameters for each of the plurality of slices. The second regularization term can provide stronger regularization than the first regularization term. Therefore, the system can ensure that the neural network is not significantly modified in response to seeing a new input belonging to a particular slice.

For example, the loss function can include a first regularization term $a*L2(W)$ that regularizes the set of shared parameters W, wherein L2 is an L2 regularization function. The system can include a second regularization term $b_1*L2(W_1)$ that regularizes the set of slice parameters $W_1$ for slice 1. The system can set the parameter $b_1$ to be larger than the parameter a such that the second regularization term can provide stronger regularization than the first regularization term. Therefore, the system can ensure that the set of slice parameters $W_1$ in the neural network are not significantly modified when the system receives a new input belonging to slice 1.

In some implementations, the system can update a set of slice parameters corresponding to a particular slice or add a new set of slice parameters for a new slice even after the neural network has been trained or deployed, without affecting the shared parameters and the slice parameters of the other slices.

For example, the system can freeze or fix the shared parameters and can only retrain the set of slice parameters corresponding to a particular slice, while also freezing the parameters of the other slices. In this way, the system can improve the accuracy of the model after deployment because the system can update the slice parameters for a specific slice, e.g., for golf carts, without affecting the shared parameters and the slice parameters of other slices.

As another example, after deploying a trained neural network model, the system can add new slice parameters for a new slice, e.g., a new brand of motorcycles, in order to improve the accuracy of the model on the inputs belonging to the new slice. The system can freeze the existing parameters to preserve the good performance on the other slices, and only train the new slice parameters corresponding to the new slice, e.g., the new motorcycle brand.

Figure 4:
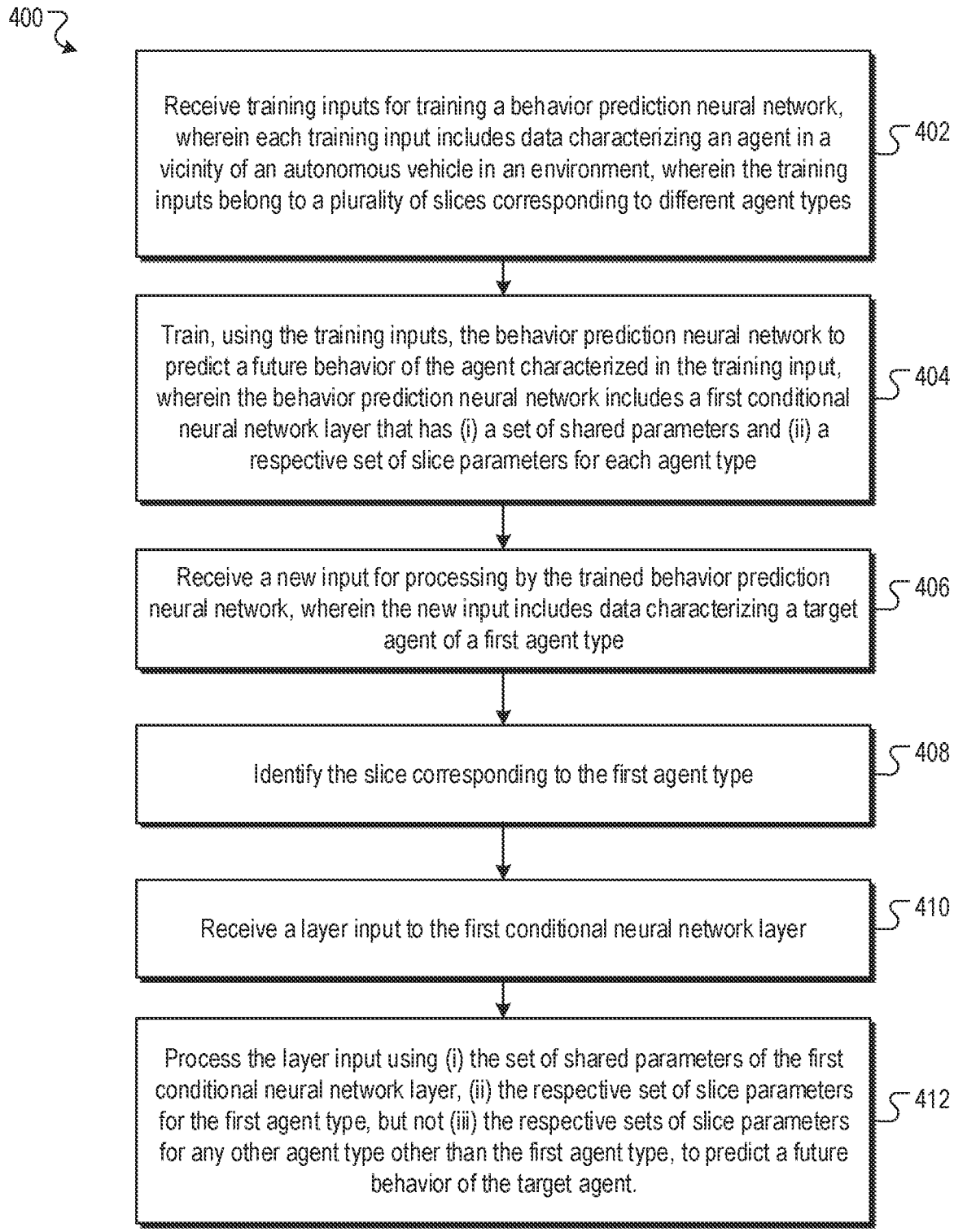
FIG. 4 is a flow diagram of an example process for training and deploying a dynamic neural network for behavior prediction.

FIG. 4 is a flow diagram of an example process 400 for training and deploying a dynamic neural network for behavior prediction. For convenience, the process 400 will be described as being performed by a system of one or more computers located in one or more locations. For example, a neural network system, e.g., the neural network system 100 of FIG. 1, appropriately programmed, can perform the process 400.

The system receives training inputs for training a behavior prediction neural network (402). Each training input includes data characterizing an agent in a vicinity of an autonomous vehicle in an environment. The agent can be a vehicle, a cyclist, a pedestrian, and so on, travelling on the road in the vicinity of the autonomous vehicle. An agent is in the vicinity of an autonomous vehicle in an environment when the agent is within a range of at least one of the sensors of the autonomous vehicle.

The training input can include one or more perception outputs generated by a perception system. In some implementations, the training input can be generated from sensor data captured by a sensor of the autonomous vehicle. For example, the training input can include point cloud data captured by a lidar sensor of the autonomous vehicle. As another example, the training input can include an image captured by a camera sensor of the autonomous vehicle.

In some implementations, the training inputs can belong to a plurality of slices corresponding to different agent types. For example, regular vehicles may represent 98% of the training inputs in the training data. Trucks may represent 1.8% of the training inputs in the training data. Golf carts may represent 0.2% of the training inputs in the training data. In this case, trucks and golf carts are under-represented in the training data.

In some implementations, the training inputs can belong to a plurality of slices corresponding to different driving contexts of the autonomous vehicle. For example, the driving contexts can include parking or un-parking (e.g., not in a parking lot), traveling in a lane, doing a lane change or pulling over by either the autonomous vehicle or another vehicle in the environment, and so on. As another example, the driving contexts can include different weather conditions, e.g., snow or rain. As another example, the driving contexts can include time of the day, e.g., day time or night time. As another example, the driving contexts can include different geographical locations, e.g., different cities or towns.

In some implementations, the training inputs can belong to a plurality of slices corresponding to different clusters to which embeddings of the training inputs belong. For example, the system can generate an embedding of the training input using an embedding neural network, e.g., a feature extraction neural network that extracts particular features from a training input. The system can identify a cluster to which the embedding of the training input belongs.

The system trains, using the training inputs, the behavior prediction neural network to predict a future behavior of the agent characterized in the training input (404). The output of the behavior prediction neural network can be actions, trajectories and probabilistic quantities. For example, the behavior prediction neural network can include a deep neural network that can predict the future behavior of different road users.

The behavior prediction neural network includes a first conditional neural network layer that has (i) a set of shared parameters and (ii) a respective set of slice parameters for each agent type. Thus, the system can train the set of shared parameters of the first conditional neural network layer using all the training inputs, and can train the corresponding set of slice parameters in response to receiving a training input belonging to a specific agent type.

For example, the training data can belong to three slices: slice 1 (regular vehicles), slice 2 (trucks), and slice 3 (golf carts). When the system receives a training input characterizing a truck, the set of slice parameters for slice 2 can be updated, as well as the set of the shared parameters.

The system receives a new input for processing by the trained behavior prediction neural network (406). The new input includes data characterizing a target agent of a first agent type. In some implementations, the new input can include data characterizing a driving context or a cluster that the new input belongs to, and so on. Similar to the training inputs, the new input can be generated from a perception output and/or sensor data captured by a sensor of the autonomous vehicle.

The system identifies the slice corresponding to the first agent type (408). The system receives a layer input to the first conditional neural network layer (410).

The system processes the layer input using (i) the set of shared parameters of the first conditional neural network layer, (ii) the respective set of slice parameters for the first agent type, but not (iii) the respective sets of slice parameters for any other agent type other than the first agent type, to predict a future behavior of the target agent (412).

For example, the training inputs can belong to one or more slices based on different driving contexts, e.g., whether the autonomous vehicle is at a parking lot. The system can determine that the new input characterizes a vehicle that is at a parking lot. The system can identify the slice corresponding to the parking lot environment. The system can use the set of shared parameters and the set of slice parameters corresponding to the parking lot slice to process the layer input, and to predict a future behavior of the vehicle in the parking lot.

Therefore, the behavior prediction neural network can automatically modify the neuron computations by using the corresponding set of slice parameters for the slice to which the new input belongs, while still using the set of shared parameters for any new input. Instead of only performing well on average, e.g., performing well on the well-represented agent type such as regular cars, the behavior prediction neural network can perform well on the under-represented agent types as well, such as trucks and golf carts.

For example, the system can identify that the new input is a sequence of images of a golf cart. The system can identify the slice corresponding to the agent type of golf carts, e.g., slice 3 in the previous example. The system can receive a layer input to the first conditional neural network layer, and the layer input can be an output from a previous layer of the neural network. The system can process the layer input using the set of shared parameters and the set of slice parameters for slice 3 corresponding to the agent type of golf carts. The system will not process the layer input using the sets of slice parameters for slice 1 (regular vehicles) and slice 2 (trucks).

In some implementations, the network output, e.g., the predicted future behavior of the agent, can be used by a planning system of the autonomous vehicle to plan a future trajectory of the autonomous vehicle, e.g., a safe and plausible trajectory. For example, the behavior prediction neural network can predict that a pedestrian near the autonomous vehicle is very likely to cross the road. Based on this behavior prediction, the planning system of the autonomous vehicle can plan to apply the brakes to slow down.

In some implementations, during the training of the behavior prediction neural network, the system may only perform the steps 402 and 404. In some implementations, once trained, the system may only perform the steps 406 to 412.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving an input for processing by a neural network to generate a prediction for a road user in an environment, wherein
      the input is derived from sensor data captured by one or more sensors of an autonomous vehicle, and
      the neural network comprises a set of shared parameters and respective sets of slice parameters for each of a plurality of different types of road users;
   determining a type of the road user;
   selecting a set of slice parameters based on the type of the road user; and
   processing the input using the neural network and based on the set of shared parameters and the selected set of slice parameters corresponding to the type of the road user to generate the prediction for the road user.

2. The method of claim 1, wherein the neural network is an image classification neural network that has been trained to classify an object characterized in the input.

3. The method of claim 1, wherein the neural network is an object detection neural network that has been trained to detect objects characterized in the input.

4. The method of claim 1, wherein the neural network is an object segmentation neural network that has been trained to generate a segmentation of the input.

5. The method of claim 1, wherein the neural network is a behavior prediction neural network that has been trained to predict a future behavior of the road user characterized in the input, wherein the prediction for the road user comprises a predicted behavior of the road user.

6. The method of claim 1, wherein the neural network comprises a first conditional neural network layer that has (i) the set of shared parameters and (ii) the respective sets of slice parameters, wherein processing the input using the neural network comprises:
   receiving a layer input to the first conditional neural network layer; and
   processing the layer input using (i) the set of shared parameters of the first conditional neural network layer, (ii) the selected set of slice parameters corresponding to the type of the road user, but not (iii) the respective sets of slice parameters that do not correspond to the type of the road user.

7. The method of claim 1, comprising: processing, by a planning system of the autonomous vehicle, the prediction for the road user to plan a future trajectory of the autonomous vehicle.

8. A system comprising one or more computers and one or more storage devices storing instructions that when executed by the one or more computers cause the one or more computers to perform operations comprising:
   receiving an input for processing by a neural network to generate a prediction for a road user in an environment, wherein
      the input is derived from sensor data captured by one or more sensors of an autonomous vehicle, and
      the neural network comprises a set of shared parameters and respective sets of slice parameters for each of a plurality of different types of road users;
   determining a type of the road user;
   selecting a set of slice parameters based on the type of the road user; and
   processing the input using the neural network and based on the set of shared parameters and the selected set of slice parameters corresponding to the type of the road user to generate the prediction for the road user.

9. The system of claim 8, wherein the neural network is an image classification neural network that has been trained to classify an object characterized in the input.

10. The system of claim 8, wherein the neural network is an object detection neural network that has been trained to detect objects characterized in the input.

11. The system of claim 8, wherein the neural network is an object segmentation neural network that has been trained to generate a segmentation of the input.

12. The system of claim 8, wherein the neural network is a behavior prediction neural network that has been trained to predict a future behavior of the road user characterized in the input, wherein the prediction for the road user comprises a predicted behavior of the road user.

13. The system of claim 8, wherein the neural network comprises a first conditional neural network layer that has (i) the set of shared parameters and (ii) the respective sets of slice parameters, wherein processing the input using the neural network comprises:
   receiving a layer input to the first conditional neural network layer; and
   processing the layer input using (i) the set of shared parameters of the first conditional neural network layer, (ii) the selected set of slice parameters corresponding to the type of the road user, but not (iii) the respective sets of slice parameters that do not correspond to the type of the road user.

14. The system of claim 8, the operations comprise: processing, by a planning system of the autonomous vehicle, the prediction for the road user to plan a future trajectory of the autonomous vehicle.

15. One or more non-transitory computer-readable storage media storing instructions that when executed by one or more computers cause the one or more computers to perform operations comprising:
   receiving an input for processing by a neural network to generate a prediction for a road user in an environment, wherein
      the input is derived from sensor data captured by one or more sensors of an autonomous vehicle, and
      the neural network comprises a set of shared parameters and respective sets of slice parameters for each of a plurality of different types of road users;
   determining a type of the road user;
   selecting a set of slice parameters based on the type of the road user; and
   processing the input using the neural network and based on the set of shared parameters and the selected set of slice parameters corresponding to the type of the road user to generate the prediction for the road user.

16. The computer-readable storage media of claim 15, wherein the neural network is an image classification neural network that has been trained to classify an object characterized in the input.

17. The computer-readable storage media of claim 15, wherein the neural network is an object detection neural network that has been trained to detect objects characterized in the input.

18. The computer-readable storage media of claim 15, wherein the neural network is an object segmentation neural network that has been trained to generate a segmentation of the input.

19. The computer-readable storage media of claim 15, wherein the neural network is a behavior prediction neural network that has been trained to predict a future behavior of the road user characterized in the input, wherein the prediction for the road user comprises a predicted behavior of the road user.

20. The computer-readable storage media of claim 15, wherein the neural network comprises a first conditional neural network layer that has (i) the set of shared parameters and (ii) the respective sets of slice parameters, wherein processing the input using the neural network comprises:
   receiving a layer input to the first conditional neural network layer; and
   processing the layer input using (i) the set of shared parameters of the first conditional neural network layer, (ii) the selected set of slice parameters corresponding to the type of the road user, but not (iii) the respective sets of slice parameters that do not correspond to the type of the road user.

* * * * *